UNITED STATES PATENT OFFICE.

HENRY NOEL POTTER, OF NEW YORK, N. Y., ASSIGNOR TO GEORGE WESTINGHOUSE, OF PITTSBURG, PENNSYLVANIA.

PRINTING-INK.

No. 908,133.   Specification of Letters Patent.   Patented Dec. 29, 1908.

Application filed July 2, 1907. Serial No. 381,937.

*To all whom it may concern:*

Be it known that I, HENRY NOEL POTTER, a citizen of the United States, and resident of New York, county of New York, State of New York, have invented certain new and useful Improvements in Printing-Inks, of which the following is a specification.

I have invented certain new and improved printing inks hereinafter described. It is well known that printing inks are of extremely diverse compositions to suit the particular uses intended or to meet the ideas of the particular ink maker as to quality, price, color, ease of working, durability, gloss, speed of drying, etc. Inks may for present purposes be divided into fluid or writing inks and pasty or printing inks. With the latter, containing solid particles, this application is exclusively concerned.

Printing inks may be broadly classified as black inks and colored inks. All printing inks contain coloring matter and a varnish. The applicant is advised that black inks are made only of pigment and varnish, while colored inks usually contain a third ingredient called a "base". A base is understood to be a finely subdivided solid in general chemically inert to the other ink ingredients introduced to thicken the varnish and lessen the amount of relatively expensive dry coloring matter to be used to give the desired consistency.

A base may and often does materially affect the physical properties of the ink containing it so that certain substances are good as bases, others are not.

The two bases most in use are probably aluminum hydrate for the best grades of ink, and blanc fixe or precipitated barium sulfate for cheaper grades and special purposes. Many other substances have been tried.

I have discovered a novel white base consisting of silica, silicon dioxid, $SiO_2$, made by producing silicon monoxid in an electric furnace by the partial reduction of silica or otherwise (see applicant's application #238,925, of December 30, 1904,) and discharging the said monoxid into air and there allowing it to burn back into dioxid in the form of a fine amorphous powder which is white when dry but almost perfectly transparent when wet with oil or other liquid having a high index or refraction of light.

The name given to the dioxid powder by myself and my associates is "diox". Under that name it is already known to those who are informed upon the progress of my work. This white dioxid powder is not fine or so soft as the "monox" powder described in another application of even date with this one, but it is colorless and does not cake into lumps and mixes easily into inks with pigments and varnishes of all kinds. It is particularly valuable as a substitute for aluminum hydrate as a base in light colored inks, particularly such as are more or less translucent and are used in plural color processes and elsewhere where a plurality of colors are superposed to secure intermediate color effects. Its advantage over aluminum hydrate lies particularly in its ease of grinding. It might be thought that this diox base being simply silica cannot differ much from infusorial earth or ground quartz but it does differ physically from these substances as it is much finer than it would be possible to grind quartz without impractical expense and it is not so absorbent as infusorial earth and being composed of solid as distinguished from hollow particles, it acts differently and better as regards drying of the varnish and in other respects.

I append formulæ for inks of several colors selected from a great number of such inks that have been successfully tried.

FORMULÆ FOR DIOX INKS.

#1. Diox Bronze Blue.

Bronze blue ---------- 55 weights
"Diox" ------------- 55 weights
Varnish ------------- Q. S.

#2. Diox Orange.

Chrome orange ------ 130 weights
"Diox" ------------- 130 weights
Varnish ------------- Q. S.

#3 Diox Job Red.

"Sun" Red --------- 100 weights
"Diox" ------------- 100 weights
Varnish ------------- Q. S.

I claim as my invention:

1. A printing ink composed of a suitable varnish, a coloring ingredient, and silicon dioxid.

2. A printing ink composed of a suitable varnish, a coloring ingredient, and that form of silicon dioxid resulting from oxidizing silicon monoxid.

3. A printing ink containing as one ingredient the finely divided product resulting from oxidizing finely subdivided silicon monoxid.

Signed at New York, in the county of New York, and State of New York, this 28th day of June A. D. 1907.

HENRY NOEL POTTER.

Witnesses:
Wm. H. Capel,
Thos. H. Brown.